(12) United States Patent
Taji et al.

(10) Patent No.: US 6,441,527 B1
(45) Date of Patent: *Aug. 27, 2002

(54) A.C. GENERATOR FOR VEHICLE (75) Inventors: Ryoichi Taji; Yoshihito Asao; Masahiko Fujita, all of Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/576,899

(22) Filed: May 23, 2000

(30) Foreign Application Priority Data

Feb. 10, 2000 (JP) ........................................ 2000-033196

(51) Int. Cl.[7] .............................. H02K 3/04; H02K 5/24; H02K 9/00; H02K 1/32
(52) U.S. Cl. ........................ 310/201; 310/208; 310/260; 310/59; 310/63; 310/65
(58) Field of Search ................................. 310/179, 201, 310/208, 260, 52, 58, 59, 62, 63, 64, 65

(56) References Cited

U.S. PATENT DOCUMENTS

| 559,692 A | * | 5/1896 | Fiske et al. ................. 310/208 |
| 685,966 A | * | 11/1901 | Blood ........................ 310/208 |
| 1,694,464 A | * | 12/1928 | Apple ........................ 310/208 |
| 1,926,331 A | * | 9/1933 | Cullin ........................ 310/208 |
| 5,561,334 A | * | 10/1996 | Ishida et al. ................. 310/62 |
| 5,952,749 A | * | 9/1999 | Umeda et al. ................. 310/63 |
| 5,955,810 A | * | 9/1999 | Umeda et al. ............. 310/208 |
| 5,965,965 A | * | 10/1999 | Umeda et al. ................. 310/52 |
| 6,011,332 A | * | 1/2000 | Umeda et al. ................. 310/58 |

FOREIGN PATENT DOCUMENTS

| JP | 63-194543 | * | 8/1988 | |
| JP | 11-164504 | | 6/1999 | ............ H02K/3/24 |

* cited by examiner

Primary Examiner—Nestor Ramirez
Assistant Examiner—Dang Dinh Le
(74) Attorney, Agent, or Firm—Sughrue Mion, PLLC (57) ABSTRACT

Coil ends (19) of a stator coil (18) having a cross sectional shape like a flat rectangular are constructed by first portions extending from an outer layer of a pair of slots apart from predetermined pitches in an axial direction and slanting in a circumferential direction, second portions extending from an inner layer of the other of the pair of the slots in the axial direction and slanting in the circumferential direction, and third portions positioned at ends of the coil ends (19) in the axial directions, elongated in the radial direction and connected to ends of the first and second portions in the axial direction, and in all of the first, second and third portions, long sides (300) of the cross sectional flat rectangular view of the stator coil (18) are arranged to be substantially in parallel with an end surface of the stator whereby the coil ends are lowered; and the coils are arranged without a gap.

19 Claims, 10 Drawing Sheets

SEGMENT COIL 23

PRIOR ART

A.C. GENERATOR FOR VEHICLE

BACKGROUND OF THE INVENTION

1. Field of the Invention

The present invention relates to an a.c. generator for vehicle, in particular a structure of a coil end of a stator of the a.c. generator for vehicle.

2. Discussion of Background

Figure 18:
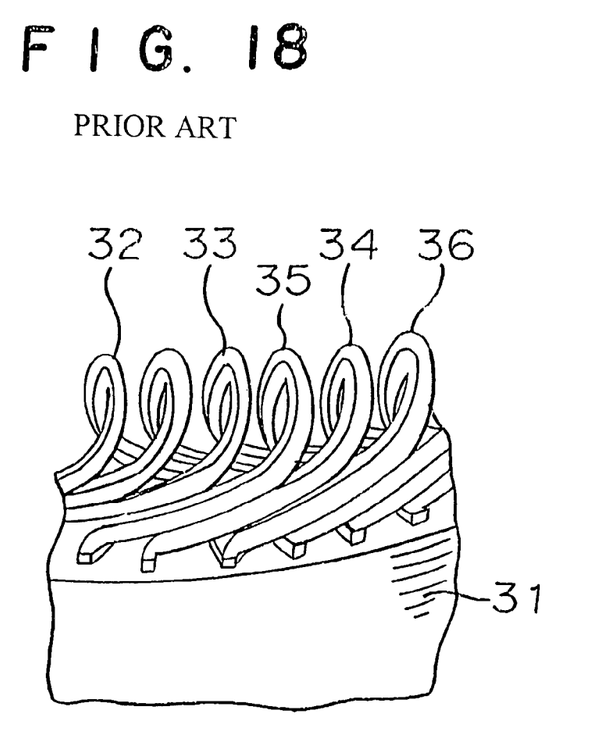
FIG. 18 is a perspective view illustrating conventional coil ends.

FIG. 18 is a perspective view of a coil end of a stator of an a.c. generator for vehicle disclosed in Japanese Unexamined Patent Publication JP-A-11-164504. In FIG. 18, a group of coils 32, 33, 34, 35, 36 inserted in an iron core 31 of the stator form stationary blades, and a path for a cooling medium is formed between coil ends. Because short sides of flat type stator winding are directed toward a surface perpendicular to an axial direction at the tops of the coil ends, although a ventilation trunk is formed for an air flowing in a radial direction to demonstrate an effect of the stationary blades, the height of the coil ends is increased, and a pressure loss of the cooling medium is increased at the tops of the coil ends, whereby a wind noise is increased, and a flow rate by a fan is decreased to thereby increase a temperature of heating element positioned on an upstream side. Further, because the ventilation trunk in the radial direction, namely a gap between coils, is formed by the stationary blades, extraneous matters are apt to intrude into the ventilation trunk, whereby cooling efficiency is spoiled; insulating coating is damaged; and therefore quality is degraded.

The conventional a.c. generator for vehicle has problems that the heights of the coil ends are increased; dimensions of the stator are increased; the length of wiring is increased; a resistance is increased; an output is decreased at time of generating electricity; and the generator is excessively heated.

Further, when the heights of the coil ends are increased, there are problems that a leak inductance at the coil ends is increased; an output is decreased; the length of the wire is increased; a cost of the wire is increased; the coil ends prevent a cooling air from flowing; and the heating element is insufficiently cooled.

Further, because the flow path for the cooling medium is formed between the coil ends, there are problems that the extraneous matters are easily intrude into an inside of the generator to cause failures; a flow of the cooling medium is made turbulent; and a wind noise is increased.

SUMMARY OF THE INVENTION

It is an object of the present invention to solve the above-mentioned problems inherent in the conventional technique and to provide an a.c. generator for vehicle, in which the heights of the coil ends are lowered and coils are arranged without interposing gaps.

According to a first aspect of the present invention, there is provided an a.c. generator for vehicle comprising:
 a shaft (5) accommodated in a casing (3) and being fixed to a pulley (4) at one end;
 a rotator (6) fixed to the shaft (5);
 a fan (7a) located on an end surface of the rotator (6) in an axial direction;
 a stator (8) assembled by a stator iron core (17) having slots and fixed to the casing (3), and a stator coil (18) accommodated in the slot; and
 a rectifier (12) electrically connected to the stator coil (18) and located on a side opposite to the pulley (4), wherein the coil ends (19) of the stator coil (18) having a cross sectional shape like a flat rectangular are constructed by first portions extending from an outer layer of a pair of slots apart from predetermined pitches in an axial direction and slanting in a circumferential direction, second portions extending from an inner layer of the other of the pair of the slots in the axial direction and slanting in the circumferential direction, and third portions positioned at ends of the coil ends (19) in the axial directions, elongated in the radial direction and connected to ends of the first and second portions in the axial direction, and in all of the first, second and third portions, long sides (300) in the cross sectional flat rectangular view of the stator coil (18) are arranged to be substantially in parallel with an end surface (17a) of the stator.

According to a second aspect of the present invention, there is provided the a.c. generator for vehicle,
 wherein the third portions of the coil ends are bend in the axial direction with a curvature, and
 the third portions are arranged substantially without interposing gaps therebetween.

According to a third aspect of the present invention, there is provided the a.c. generator for vehicle,
 wherein connecting portions between the first portions and the third portions and between the second portions and the third portions escape each other by bending in the axial directions and the radius direction so as to avoid interference between the coil ends.

According to a fourth aspect of the present invention, there is provided the a.c. generator for vehicle,
 wherein the number of slots by each pole and each phase is two or more.

According to a fifth aspect of the present invention, there is provided the a.c. generator for vehicle,
 wherein a radius R of the cross sectional flat rectangular of the stator coil in the third portions of the coil ends is larger than the radius R of portions of the slots for accommodating the stator coil.

According to a sixth aspect of the present invention, there is provided the a.c. generator for vehicle,
 wherein the length of the stator in its axial direction is shorter than the length of the rotator iron core in its axial direction.

According to a seventh aspect of the present invention, there is provided the a.c. generator for vehicle,
 wherein lengths of the coil ends protruding from the stator iron core on both sides of the shafts are the same on both of the sides.

According to an eighth aspect of the present invention, there is provided the a.c. generator for vehicle,
 wherein the length of the coil ends protruding from the stator iron core on a side of the rectifier is shorter than the length of the coil ends protruding from the stator iron core on a side of the pulley.

According to a ninth aspect of the present invention, there is provided the a.c. generator for vehicle,
 wherein the fan brings an air from an inner diameter side to the outer diameter side of the coil ends for cooling the coil ends.

According to a tenth aspect of the present invention, there is provided the a.c. generator for vehicle,
 wherein the fan (7a) is overlapped with the stator coil ends in the axial direction.

According to an eleventh aspect of the present invention, there is provided the a.c. generator for vehicle, wherein the stator coil is fabricated by connecting a plurality of segment coils as electrical conductors, and the segment coils positioned in different slots are connected after forming to bend in the circumferential direction so that open ends of the segment coils are connected.

According to a twelfth aspect of the present invention, there is provided the a.c. generator for vehicle, wherein the rectifier (12) is located on a side at which the coil ends are turned.

According to a thirteenth aspect of the present invention, the re is provided the a.c. generator for vehicle, wherein a varnish or a resin is located in the coil ends.

BRIEF DESCRIPTION OF THE DRAWINGS

A more complete appreciation of the invention and many of the attendant advantages thereof will be readily obtained as the same becomes better understood by reference to the following detailed description when considered in connection with the accompanied drawings, wherein.

DETAILED DESCRIPTION OF THE PREFERRED EMBODIMENTS

A detailed explanation will be given of preferred Embodiment of the present invention in reference to FIGS. 1 through 17 as follows, wherein the same numerical references are used for the same or similar portions and descriptions of these portions is omitted.

EMBODIMENT 1

Figure 1:
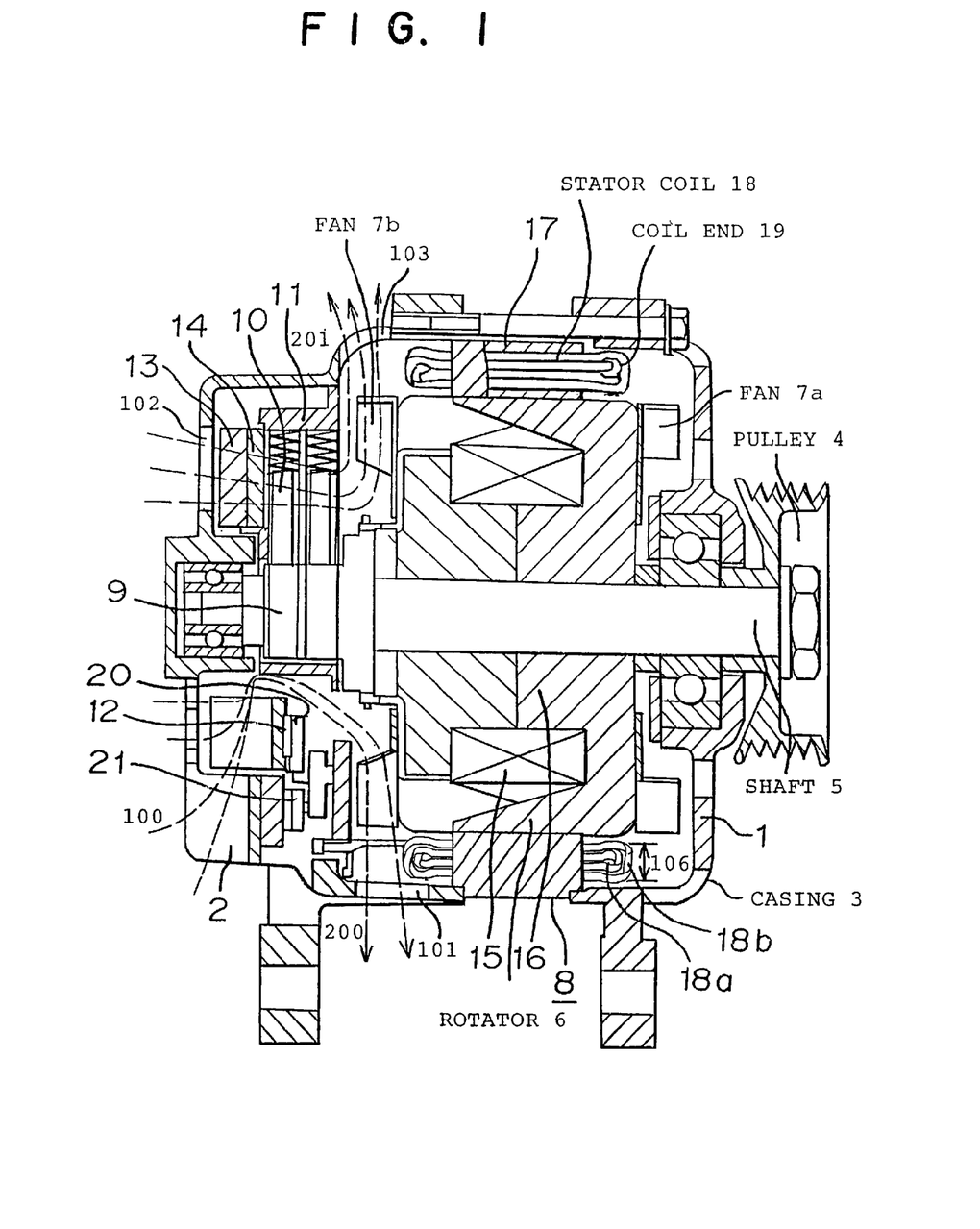
FIG. 1 is a cross sectional view of an a.c. generator for vehicle according to Embodiment 1 of the present invention.

FIG. 1 is a cross sectional view illustrating an a.c. generator for vehicle according to Embodiment 1 of the present invention. The a.c. generator includes a casing 3 constructed by frames 1 and 2 made of aluminum; a shaft 5 located in the casing 3 and fixed to a pulley 4 at one end; a claw-type rotator 6 fixed to the shaft 5; fans 7a, 7b respectively fixed to end surfaces of the rotator 6; a stator iron core 17 fixed to the casing 3; a stator coil 18 accommodated in slots of the stator iron core 17; a stator 8 constructed by the stator iron core 17 and the stator coil 18; a slip ring 9 fixed to the other end of the shaft 5 for supplying an electric current to the rotator 6; a pair of brushes 10 sliding on the slip ring 9; a brush holder 11 for accommodating the brushes 10; a rectifier 12 electrically connected to the stator coil 18 for commutating an a.c. current generated in the stator coil 18 to a e.c. current; a heat sink 13 engaged with the brush holder 11; and a regulator 14 engaged with the heat sink 13 for adjusting an a.c. voltage generated in the stator coil 18.

The rotator 6 includes a rotator coil 15 for generating a magnetic flux by an electric current and a pole core 16 served as a magnetic pole by receiving the magnetic flux. The cooling fans 7a, 7b are respectively located on end surfaces of the pole core 16 in its axial directions.

The stator 8 includes the stator iron core 17 through which a rotating magnetic field generated by the rotator 6 passes, and the stator coil 18 having a cross sectional shape like a flat rectangular through which the a.c. output current passes by the rotating magnetic field. The stator coil 18 has coil ends 19 on both ends of the stator core 17 in its axial directions.

The rectifier 12 includes diodes 20 connected to the stator coil 18 and a heat sink 21 for dissipating heat from the diodes 20.

The fan 7b rotates along rotation of the rotator 6, a cooling air flows into the casing from an opening 100 of the casing 3, and the cooling air flows like an arrow 200 to cool the heat sink 21 and the diodes 20. The cooling air further flows in an outer direction of a radius of the fan 7b and is outward discharged from an opening 101. A cooling air also flows into the casing 3 from an opening 102 by rotation of the fan 7b. The cooling air flows like an arrow 201 and cools power transistors of the heat sink 13 and the regulator 14. The cooling air flows in the outer direction of the radius of the fan 7b by the fan 7b, and is outward discharged from an opening 103.

Figure 2:
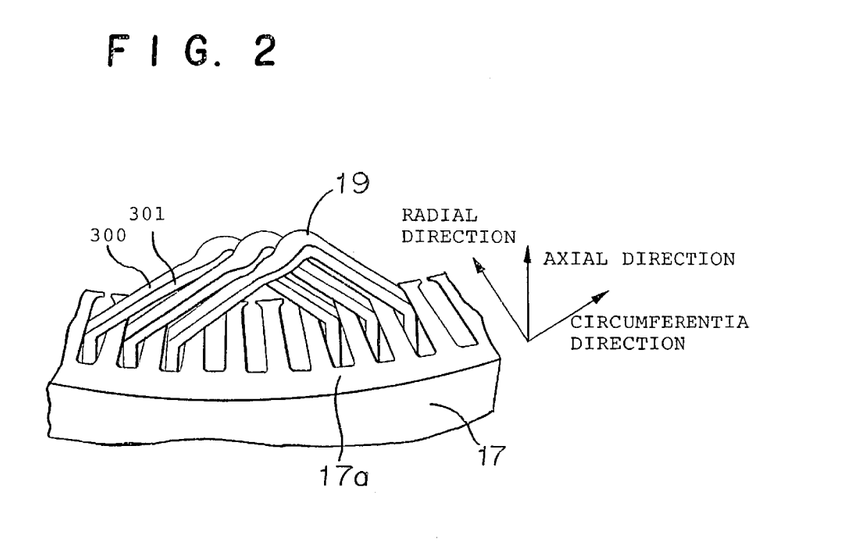
FIG. 2 is a perspective view illustrating an inner acoil ends.
Figure 3:
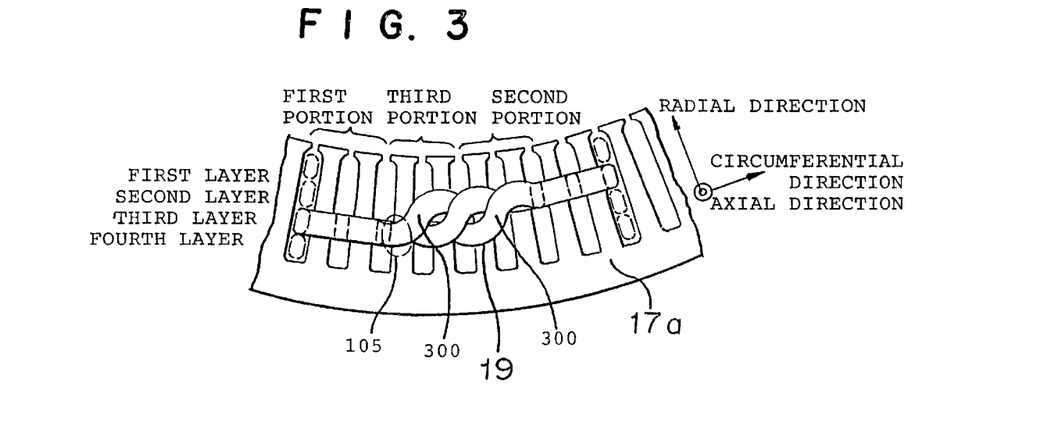
FIG. 3 is a plan view illustrating the inner coil ends.
Figure 4:
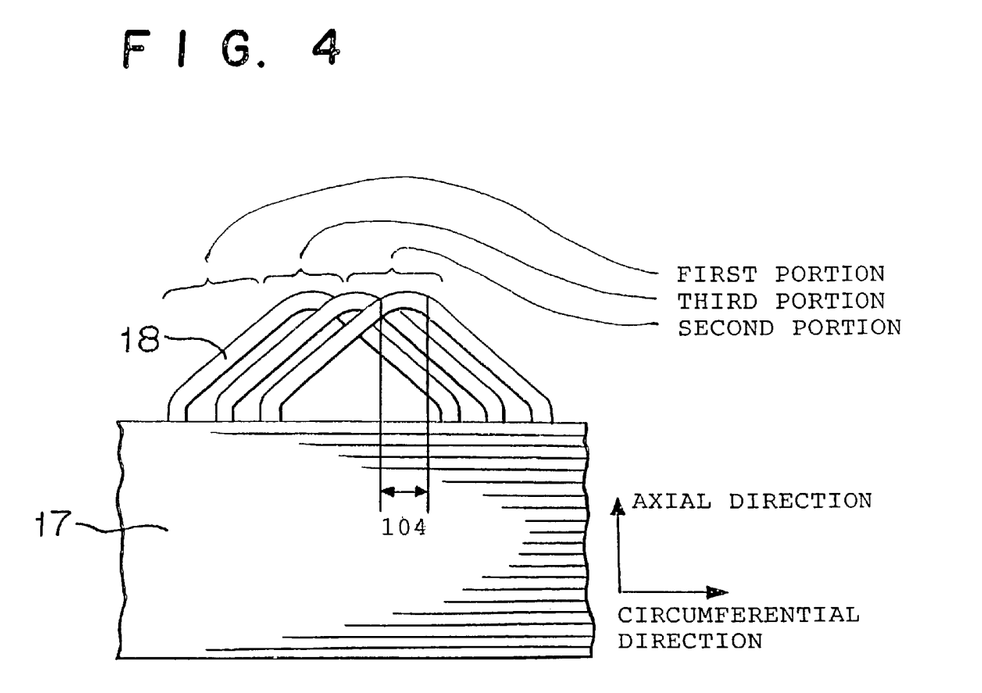
FIG. 4 is a side view illustrating the inner coil ends.
Figure 5:
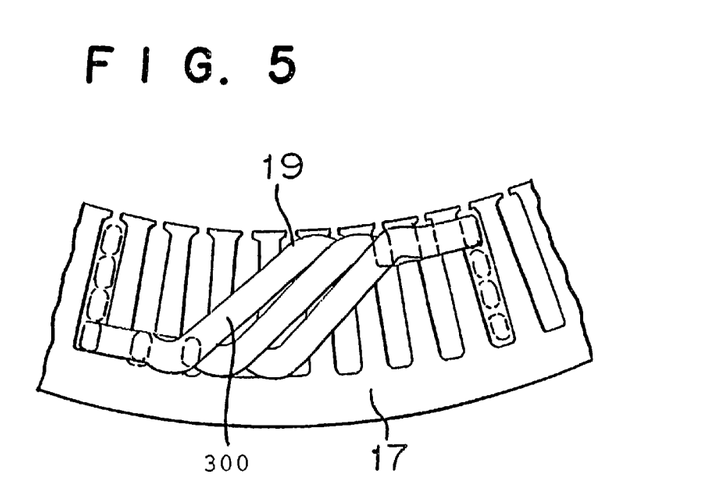
FIG. 5 is a plan view illustrating the outer coil ends.
Figure 6:
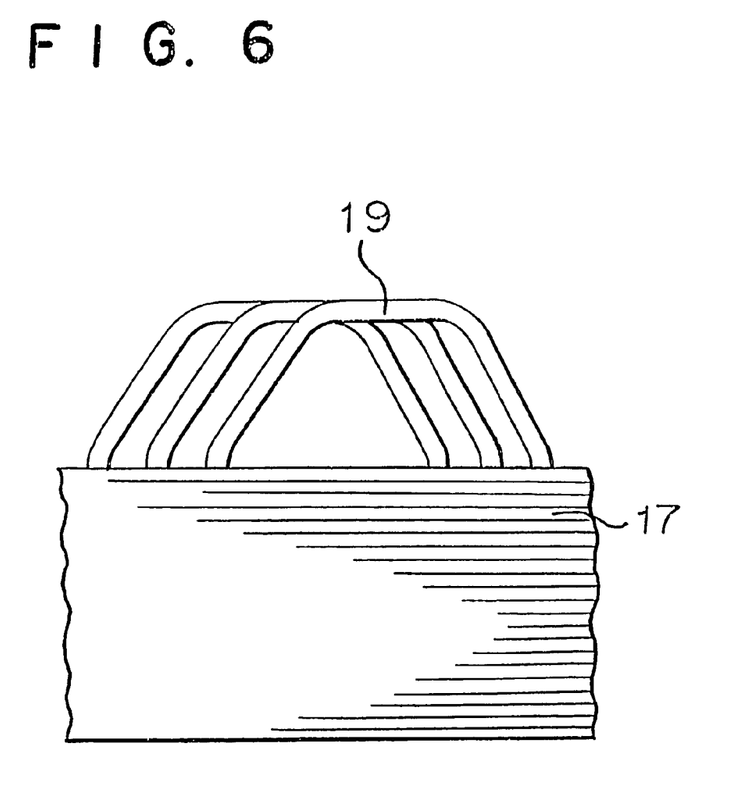
FIG. 6 is a side view illustrating the outer coil ends.
Figure 7:
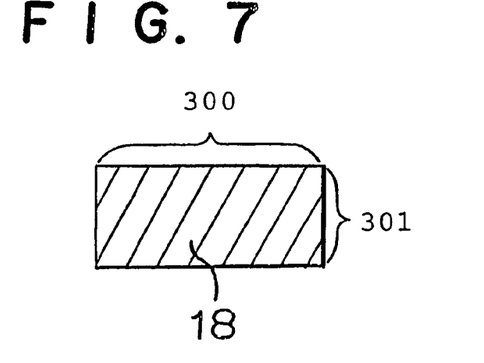
FIG. 7 is a cross sectional view illustrating a stator coil.

FIGS. 2 through 6 illustrate the coil ends 19, wherein four stator coils 18 are accommodated in a slot. FIG. 2 is a perspective view illustrating the coil ends 19 of an inner stator coil 18a. FIG. 3 is a plan view of the coil ends 19 viewed from an axial direction. FIG. 4 is a side view of the coil ends viewed from the radial direction. FIG. 5 is a plan view illustrating the coil ends 19 of an outer stator coil 18b. FIG. 6 is a side view of the coil ends. The outer stator coil 18b is located so as to cover the inner stator coil 18a. FIG. 7 is a cross sectional view of the stator coil 18 having a long side 300 and a short side 301.

As illustrated in FIGS. 2 through 4, the coil ends 19 include a first portion extending from a third layer, i.e. an outer layer, of a pair of slots apart by a predetermined pitch and slanting in a circumferential direction, a second portion extending from a second layer, i.e. an inner layer, of the other slot in the axial direction and slanting in the circumferential direction, and a third portion positioned at ends of the coil ends 19 in the axial direction, extending substantially in a radial direction, and connected to ends of the first and second portions in the axial directions.

In all of the first, second and third portions of the coil ends, the long sides 300 are arranged in parallel with an end surface 17a of the stator and a surface including the short sides 301 is arranged in vertical with the end surface 17a of the stator, namely only the long sides 300 are visible and the short sides 301 are invisible in FIG. 3, wherein there is no twisting portion in coil ends, wherein twisting portions exist in the conventional technique.

Further, in the third portions of the coil ends, a portion 105 extending in the circumferential and radial direction and bent with a curvature in the axial direction as illustrated in FIG. 4. The coil ends 19 have the same shape, and the third portions of the coil ends 19 are arranged substantially without gaps in the circumferential direction.

Therefore, the heights of the third portions are lowered, and it becomes possible to arrange the stator coils 18 without gaps.

Further, connecting portions between the first portions and the third portions and between the second portions and the third portions have a relief 105 bending in the axial and radial direction so as to avoid interference between the coil ends 19.

Accordingly, because the heights of the third portions of the coil ends are lowered, it is possible to make an entire a.c. generator for vehicle small; an air flow resistance at the third portions is decreased; cooling capability is improved; and a temperature of a heating element is decreased. Further, a resistance of the coils and a leak inductance from the coil ends are reduced, whereby an output is improved. Further, because a copper loss is decreased, efficiency is improved.

Further, because the heights of the coil ends is lowered, a pressure loss of the cooling air is decreased. Unevenness of a surface of the rotator becomes small, whereby an interference sound between the coil ends and the cooling air can be decreased.

Further, because the amount of the copper, i.e. coil, at a high unit price is decreased, a production cost can be reduced.

Further, because the third portions of the coil ends 19 are arranged substantially without gaps, an extraneous matter is not easily intrude from an outside into the third portions, whereby it becomes possible to avoid damages to a coil insulating coating, an insulating property is improved, and an interference sound between the cooling air and the third portion can be canceled.

Further, because the rotator 6 is constructed so as to avoid an interference between the coil ends, it becomes possible to lower the heights of the coil ends, and a short caused by the interference can be prevented to thereby enhance an insulating property.

Figure 8:
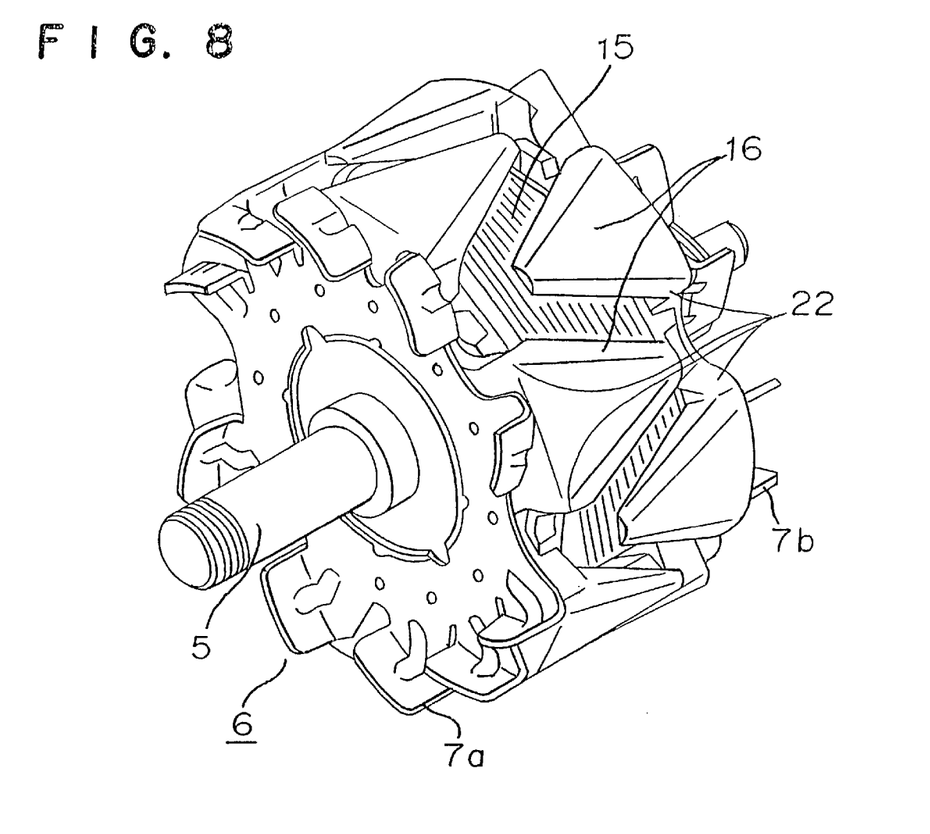
FIG. 8 is a perspective view illustrating a rotator of a claw pole type.

Further, the rotator 6 is a claw pole type as illustrated in FIG. 8. Therefore, shoulders 22 can be used as a means for blowing an air, whereby a cooling capability is further improved. Meanwhile, the rotator 6 may be a salient type.

EMBODIMENT 2

Figure 9:
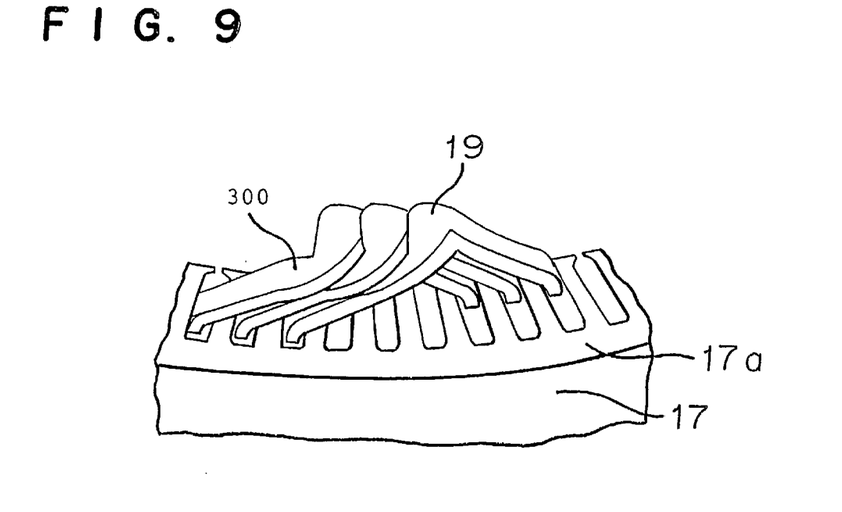
FIG. 9 is a perspective view illustrating coil ends according to Embodiment 2 of the present invention.
Figure 10:
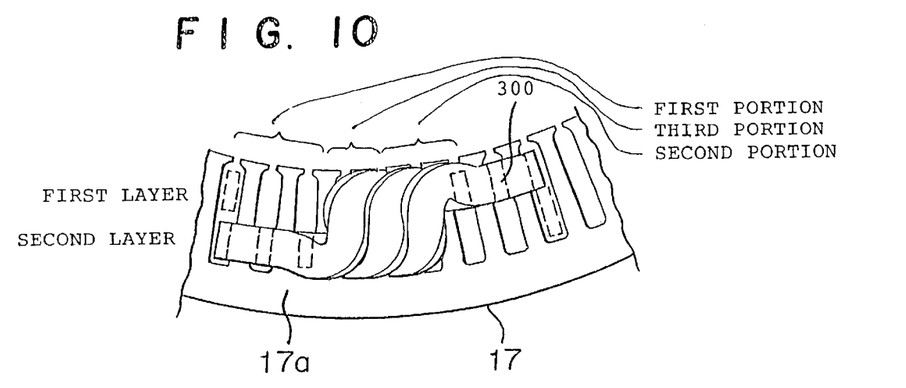
FIG. 10 is a plan view illustrating the coil ends according to Embodiment 2 of the present invention.
Figure 11:
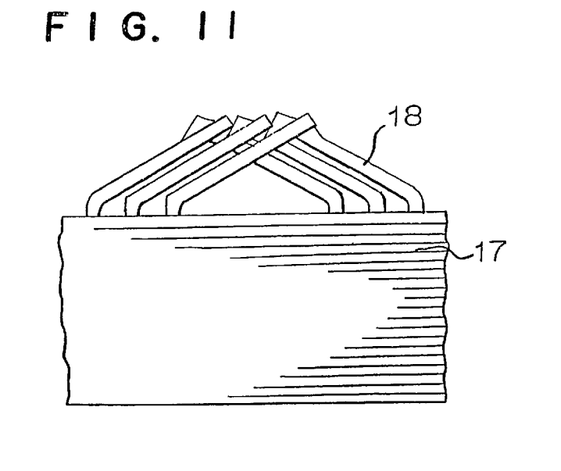
FIG. 11 is a side view illustrating coil ends according to Embodiment 2 of the present invention.

FIGS. 9 through 11 illustrate coil ends 19 according to Embodiment 2 of the present invention, wherein two stator coils 18 are accommodated in a slot. FIG. 9 is a perspective view illustrating the coil ends 19. FIG. 10 is a plan view of FIG. 9 viewed from an axial direction. FIG. 11 is a side view of FIG. 9 viewed from a radius direction.

As illustrated in FIGS. 9 through 11, the coil ends 19 include a first portion extending from a second layer of a pair of slots apart by a predetermined pitch and slanting in a circumferential direction, a second portion extending from an inner layer of the other slot in the axial direction and slanting in a circumferential direction, and a third portion positioned at ends of the coil ends 19 in the axial direction and extending substantially in the radius direction so as to be connected to ends of the first and second portions in the axial direction.

In all of the first, second and the third portions of the coil ends, the long side 300 is in parallel with an end surface 17a of the stator, and a surface including short sides 301 is perpendicular to the end surface 17a of the stator. In other words, in FIG. 10, only the long side 300 can be observed and the short sides 301 can be seldom observed. Not like the conventional technique, there is no twisting portion at the coil ends.

Further, connecting portions between the first and third portions and between the second and third portions of the coil ends 19 have a relief bending in the axial and radius direction so as to avoid interference between the coil ends 19. Because of such a structure of avoiding the interference between the coil ends, it is possible to lower the heights of the coil ends, insulation is enhanced by preventing a short caused by the interference, and the stator coils 18 are arranged without any gap.

EMBODIMENT 3

Figures 12A, 12B:
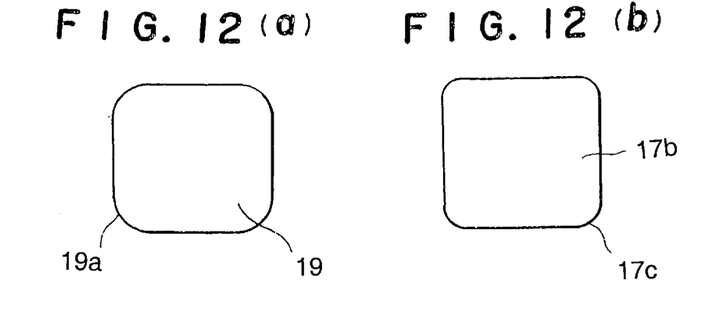
FIG. 12a is a cross sectional view of a stator coil according to Embodiment 3 of the present invention.
FIG. 12b is a cross sectional view of a stator coil according to Embodiment 3 of the present invention.

It is also possible to make a radius of corner portions 19a in a cross sectional flat rectangular shape of third portions of coil ends 19, illustrated in FIG. 12a, larger than a radius of a cross sectional shape of corner portions 17c of a slot 17b of a stator iron core 17 for accomodating stator coils 18 illustrated in FIG. 12b. Because the radius of the corner portions 19a of the coil ends 19 is increased where the coil ends are in contact with each other, coils are not in contact at edges; it is possible to prevent a coating from peeling off; and much wiring can be efficiently arranged in the slots.

Further, it is possible to construct such that at least one of the coil ends 19 of the stator coil 18 is arranged on a downstream side next to a fan 7 as a means for blowing an air.

By arranging the coil ends 19 on the downstream side next to the means for blowing an air, it is possible to improve a capability of cooling.

Further, at least one of frames 1 and 2 may be formed to have a plurality of openings on an outer peripheral side of the coil ends 19. Because there are the plurality of openings on the outer peripheral side of the coil ends 19, it is possible to improve heat dissipation to the outer peripheral side. Further, the stator coils 18 are arranged without a gap therebetween, whereby it is possible to prevent an extraneous matter from intruding from the openings to the coil ends 19.

Further, it may be construct such that the plurality of openings are formed in a range other than a portion 106 in FIG. 1, at which cores of the coil ends 19 protrude.

Although an excessive air flow and an extraneous matter from an outside are apt to intrude into the portion where the cores protrude because spaces between the stator coils 18 exists, it is possible to prevent such troubles by locating the openings in a range other than the portion.

EMBODIMENT 4

As illustrated in FIG. 1, because the fans 7a, 7b rotating along with the rotator 6 are provided as a means for blowing an air, it is possible to certainly cool a generator at a low cost. Further, the fan 7 may be located on at least one end of the rotator 6, whereby coil ends 19 can be cooled by sending an air from an inner peripheral side to an outer peripheral side.

Because the means for blowing air is the fan 7, a speed of the air is maximum at tip ends of the coil ends 19 positioned on a downstream side. Since an air resistance in the third portion extremely deteriorates a capability of the fan, the coil ends 19 are preferable. Further, the coil ends 19 receive the cooling air from the inner peripheral side through the coil ends 19 to a frame opening positioned outside the coil ends 19 by the fan 7 located at the end of the rotator 6, whereby a cooling effect is high.

Figure 13:
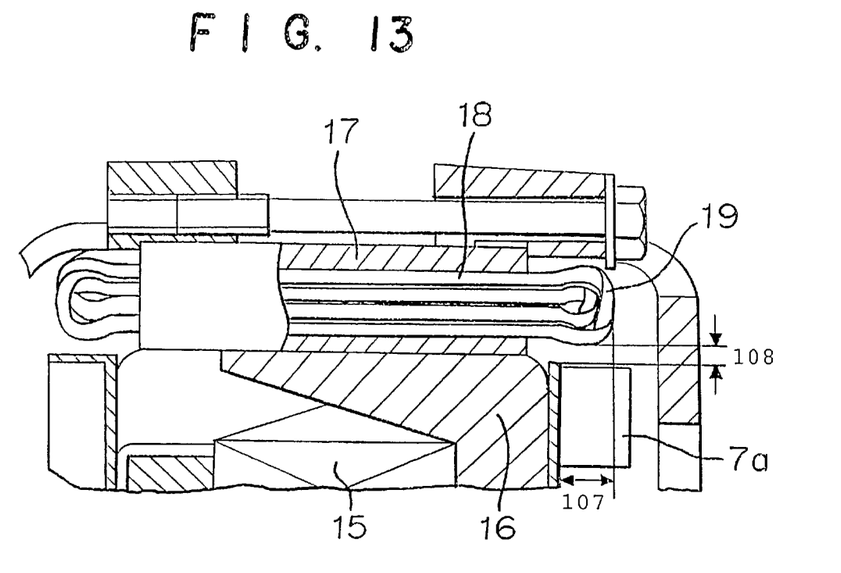
FIG. 13 is a cross sectional view of a part of an a.c. generator for vehicle according to Embodiment 4 of the present invention.

Further, as illustrated in FIG. 13, the fan 7 may be overlapped with the coil ends 19 of the stator in an axial direction by a distance 107.

Because the fan 7 is overlapped with the coil ends 19 in the axial direction, a cooling effect is high.

Further, it may be constructed such that a distance 108 between an inner peripheral surface of the coil ends 19 and an outer diameter of the fan 7 in FIG. 13 is substantially equal along a circumferential direction. In this case, an interference sound generated between fan blades and the coil ends is equalized to reduce a wind noise.

EMBODIMENT 5

It is possible to make the length of a stator 8 in an axial direction shorter than the length of a rotator iron core in its axial direction. Because stator coils 18 are not spaced, coil ends 19 can be made low and shorter than the rotator 6 in the axial direction, a resistance against a cooling air is reduced; a capability of cooling inner components such as a rectifier 12 and a regulator 14 as heating elements is improved; and the generator can be miniaturized.

EMBODIMENT 6

Figure 14:
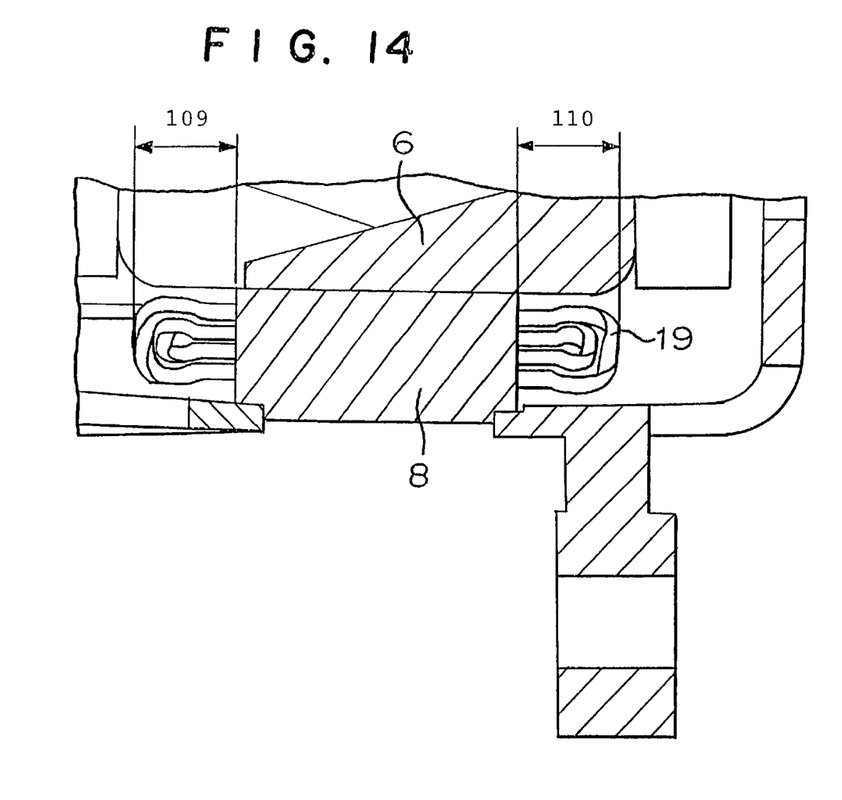
FIG. 14 is a cross sectional view of a part of an a.c. generator for vehicle according to Embodiment 6 of the present invention.

As illustrated in FIG. 14, the length of coil ends 19 protruding on both sides of a shaft from a stator iron core in an axial direction may be substantially the same as illustrated in numerical references 109 and 110 of FIG 14. In this case, air resistances on both ends of a core can be made the same, and a stator 8 is uniformly cooled.

Meanwhile, a length 109 on a side of the heating element may be shorter than a length 110. In this case, the air resistance on the side of the heating element can be further reduced.

EMBODIMENT 7

The number of slots by each pole and each phase may be two or more. In this case, the number of slots for accommodating coils is large, whereby it is possible to arrange coil ends 19 of the coils without gaps.

EMBODIMENT 8

Figure 15:
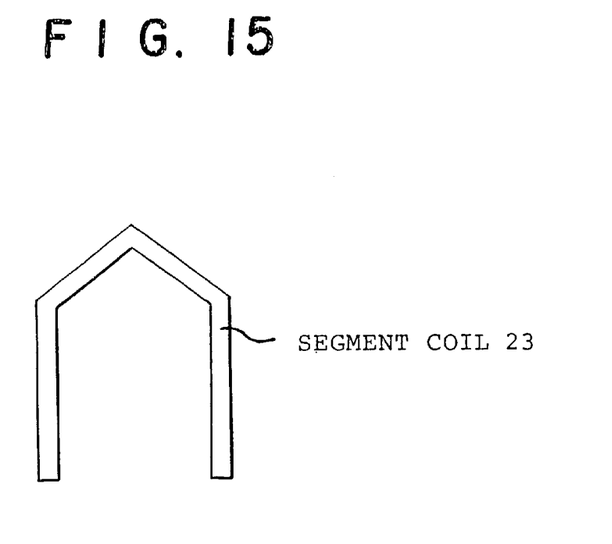
FIG. 15 is a side view illustrating a stator coil according to Embodiment 8 of the present invention.

It is also possible to construct a stator coil 18 by connecting a plurality of electrical conductors, i.e. segment coils 23, as illustrated in FIG. 15. In this case, shapes of coil ends 19 become uniform and the coils can be easily arranged without gaps therebetween.

Figure 16:
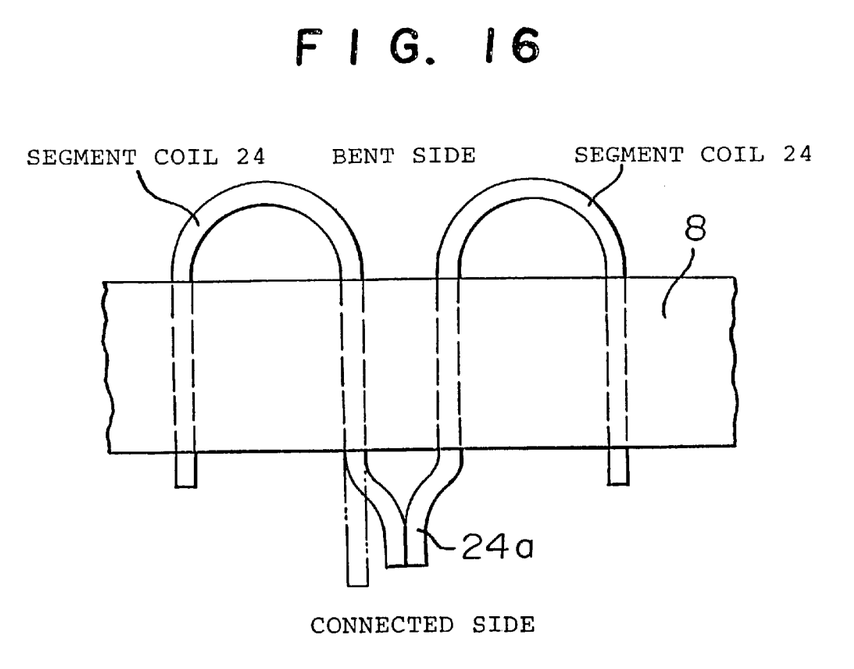
FIG. 16 is a side view illustrating a stator coil according to Embodiment 8 of the present invention.

As illustrated in FIG. 16, it is also possible to construct such that the electric conductors are U-like shape segment coils 24, the U-like shape segment coils 24 are respectively positioned in different slots, and open ends 24a of the U-like shape segment coils 24 are connected after bending the segment coils 24 in a circumferential direction.

By inserting the segment coils 24 into a core in an axial direction and connecting these, it is possible to wind the segment coils without intervals, and a production becomes easy.

In this case, coil ends 19 on a connecting side of the U-like segment coils 24 and coil ends 19 on a bending side of the U-like shape segment coils 24 are oppositely arranged. Third portions do not appear on the connecting side, and the coils can be easily formed in use of the bending side of the segment coils as the third portions.

Further, it is possible to locate a fan 7 on an end of a rotator 6 on the bending side of the stator coil ends 19. In this case, because the fan 7 is located on the end of the rotator 6 on the bending side having a shorter length of the stator coil ends 19 in the axial direction, an air resistance on a discharge side of the fan 7 is decreased, and an air flow rate is increased, whereby a temperature is reduced.

Further, it is possible to locate a rectifier 12 on the bending side. Because the rectifier 12, being a heating element, is arranged on the bending side having a shorter length of the stator coil ends 19 in the axial direction, an air resistance on the discharge side of the fan 7 is small, and an air flow rate passing through the rectifier 12 is increased, whereby a temperature of the rectifier 12 is reduced.

Further, the number of blades of a fan 7b on the bending side may be increased in comparison with the number of blades of a fan 7a on a pulley side. In this case, it becomes possible to enhance a capability of flowing a cooling air by the fan 7b on a rectifier side.

EMBODIMENT 9

By coating a varnish in at least coil ends 19 of a stator coil 18, it is possible to locate a varnish layer between the coil ends 19. In this case, small gaps between the coil ends 19 are clogged by the varnish, whereby insulation and an adhesive force are further improved.

Further, a resin layer may be located in at least gaps between the coil ends 19 of the stator coil 18 by embedding a resin. In this case, small gaps between the coil ends 19 are further clogged by the resin, whereby insulation and an adhesive force are further improved.

Figure 17:
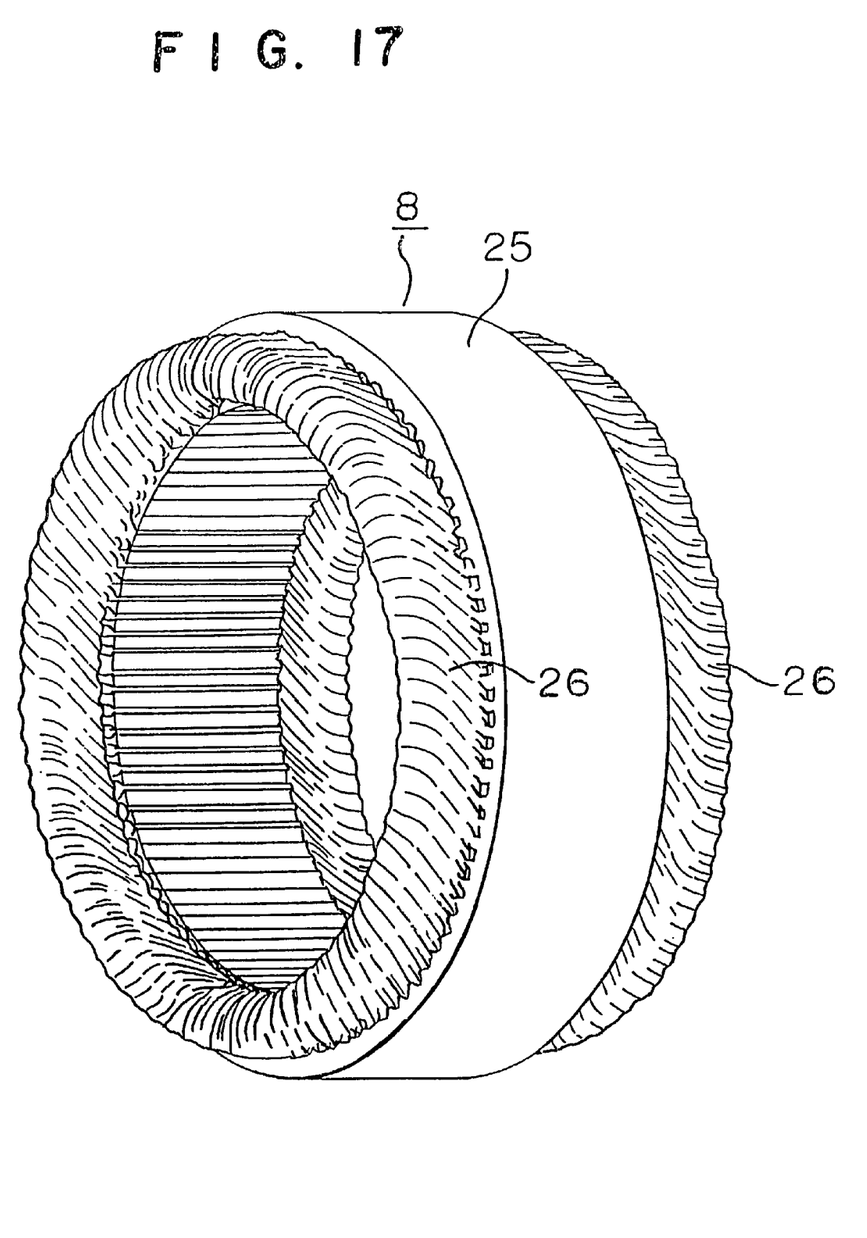
FIG. 17 is a perspective view illustrating a stator according to Embodiment 9 of the present invention.

Further, as illustrated in FIG. 17, an entire surface of the coil ends 19 may be evenly covered by a resin. In FIG. 17, numerical reference 25 designates the stator core, and numerical reference 26 designates the resin. In this case, the surface of the coil ends 19 can be made flat, whereby a resistance against a cooling air and an interference sound are further reduced.

The first advantage of the a.c. generator for vehicle according to the present invention is that an entire size of the generator can be small; the air resistance at the third portions are decreased; and the capability of cooling is improved, whereby the temperature of the heat element can be reduced. Further, the resistance of the coil and the leak inductance of the coil ends are reduced, whereby an output power is improved and the copper loss is decreased to improve the efficiency.

Further, the interference sound between the third portions and the cooling air can be reduced, and the cost can be decreased.

The second advantage of the a.c. generator for vehicle according to the present invention is that the extraneous matter does not easily intrude from the outside.

The third advantage of the a.c. generator for vehicle according to the present invention is that the short caused by the interference can be prevented, and the insulation is improved.

The fourth advantage of the a.c. generator for vehicle according to the present invention is that the coil ends of the coils can be easily arranged without gaps.

According to the fifth advantage of the a.c. generator for vehicle according to the present invention is that the coating of the coils at the coil ends can be prevented from peeling off.

The sixth advantage of the a.c. generator for vehicle according to the present invention is that the air resistance is decreased to improve the capability of cooling the heat element.

The seventh advantage of the a.c. generator for vehicle according to the present invention is that the air resistances on both ends of the core can be made the same to uniformly cool the stator.

The eighth advantage of the a.c. generator for vehicle according to the present invention is that the air resistance on the heat element side can be further reduced.

The ninth advantage of the a.c. generator for vehicle according to the present invention is that the cooling efficiency can be improved.

The tenth advantage of the a.c. generator for vehicle according to the present invention is that the cooling efficiency is improved.

The eleventh advantage of the a.c. generator for vehicle according to the present invention is that the coils can be wound without gaps and easily produced.

The twelfth advantage of the a.c. generator for vehicle according to the present invention is that the temperature of the rectifier can be reduced.

The thirteenth advantage of the a.c. generator for vehicle according to the present invention is that the coil ends can be formed with further smaller gaps.

Obviously, numerous modifications and variations of the present invention are possible in light of the above teachings. It is therefore to be understood that within the scope of the appended claims, the invention may be practiced otherwise than as specifically described herein.

The entire disclosure of Japanese Patent Application No. 12-33196 filed on Feb. 10, 2000 including specification, claims, drawings and summary are incorporated herein by reference in its entirety.

What is claimed is:

1. An a.c. generator for a vehicle comprising:
a shaft accommodated in a casing and which is fixed to a pulley at one end;
a rotator fixed to the shaft;
a fan located on an end surface of the rotator in an axial direction;
a stator including a stator iron core having a plurality of slots and fixed to the casing, and a stator coil disposed in the slots, wherein the stator coil has a rectangular cross sectional shape formed by a pair of parallel long side surfaces and a pair of parallel short side surfaces, and a width of the long side surfaces is greater than a width of the short side surfaces; and
a rectifier electrically connected to the stator coil and located on a side opposite to the pulley,
wherein coil ends of the stator coil comprise first portions extending in an axial direction from an outer layer of one of two slots spaced apart from each other by a predetermined pitch and slanting in a circumferential direction, second portions extending in an axial direction from an inner layer of the other of the pair of the slots and slanting in the circumferential direction, and third portions positioned at ends of the coil ends in the axial directions, elongated in the radial direction and connected to ends of the first and second portions in the axial direction, and in the first, second and third portions, outer long side surfaces of the rectangular cross sectional shape of the coil ends of the stator coil arranged to face away from an end surface of the stator in the axial direction along the entire length of the coil end between the two slots, and the long side surfaces face the circumferential direction inside of the slots of the stator iron core.

2. The a.c. generator according to claim 1,
wherein the third portions of the coil ends are bent in the axial direction with a curvature, and
the third portions are arranged substantially without interposing taps therebetween.

3. The a.c. generator according to claim 2,
wherein connecting portions between the first portions and the third portions and between the second portions and the third portions are bent in the axial directions and the radial direction so as to avoid interference between the coil ends.
the third portions are arranged substantially without interposing taps therebetween.

4. The a.c. generator according to claim 2,
wherein the number of slots for each pole and each phase is two or more.

5. The a.c. generator according to claim 2,
wherein a corner radius of the rectangular cross sectional shape of the stator coil in the third portions of the coil ends is larger than a corner radius of the slots for accommodating the stator coil.

6. The ac. generator according to claim 2,
wherein the length of the stator including the coil ends of the stator coil in its axial direction is shorter than the length of an rotator iron core of the rotator in its axial direction.

7. The a.c. generator according to claim 2,
wherein lengths of the coil ends protruding from opposite sides of the stator iron core are the same.

8. The a.c. generator according to claim 2,
wherein the stator coil is fabricated by connecting a plurality of segment coils as electrical conductors, and
the segment coils positioned in different slots are connected after being bent in the circumferential direction so that open ends of the segment coils are connected.

9. The a.c. generator according to claim 1,
wherein connecting portions between the first portions and the third portions and between the second portions and the third portions are bent in the axial directions and the radial direction so as to avoid interference between the coil ends.

10. The a.c. generator according to claim 1,
wherein the number of slots for each pole and each phase is two or more.

11. The a.c. generator according to claim 1,
wherein a corner radius of the rectangular cross sectional shape of the stator coil in the third portions of the coil ends is larger than a corner radius of the slots for accommodating the stator coil.

12. The a.c. generator according to claim 1,
wherein the length of the stator including the coil ends of the stator coil in its axial direction is shorter than the length of an rotator iron core of the rotator in its axial direction.

13. The a.c. generator according to claim 1,
wherein lengths of the coil ends protruding from opposite sides of the stator iron core are the same.

14. The a.c. generator according to claim 1,
wherein the length of the coil ends protruding from the stator iron core on a side of the rectifier is shorter than the length of the coil ends protruding from the stator iron core on a side of the pulley.

15. The a.c. generator according to claim 1,
wherein the fan brings air from an inner diameter side to the outer diameter side of the coil ends for cooling the coil ends.

16. The a.c. generator according to claim 1,
wherein the fan is overlapped with the stator coil ends in the axial direction.

17. The a.c. generator according to claim 1,
wherein the stator coil is fabricated by connecting a plurality of segment coils as electrical conductors, and
the segment coils positioned in different slots are connected after being bent in the circumferential direction so that open ends of the segment coils are connected.

18. The a.c. generator according to claim 1, wherein the rectifier is located on a side at which the coil ends are turned.

19. The a.c. generator according to claim 1, wherein a varnish or a resin is coated on the coil ends.

* * * * *